F. P. BARNEY.
BRACELET, NECK CHAIN, &c.
APPLICATION FILED AUG. 23, 1911.

1,071,131. Patented Aug. 26, 1913.

WITNESSES,
Herbert L. Kelley,
Calvin H. Brown

INVENTOR,
Frank P. Barney.
BY
ATTORNEY

UNITED STATES PATENT OFFICE.

FRANK P. BARNEY, OF CHARTLEY, MASSACHUSETTS.

BRACELET, NECK-CHAIN, &c.

1,071,131. Specification of Letters Patent. Patented Aug. 26, 1913.

Application filed August 23, 1911. Serial No. 645,594.

*To all whom it may concern:*

Be it known that I, FRANK P. BARNEY, a citizen of the United States, residing at Chartley, in the county of Bristol and State of Massachusetts, have invented certain new and useful Improvements in Bracelets, Neck-Chains, &c., of which the following is a specification.

My invention relates to bracelets, necklaces, watch-fobs and other analogous articles of jewelry, formed from a series of connected units, and it consists in the novel manner of construction and combination of parts comprising the same, all as more fully hereinafter set forth and claimed.

The object I have in view is to produce a solderless and strong bracelet or analogous article of jewelry, the article at the same time being comparatively inexpensive to manufacture.

Figure 1:
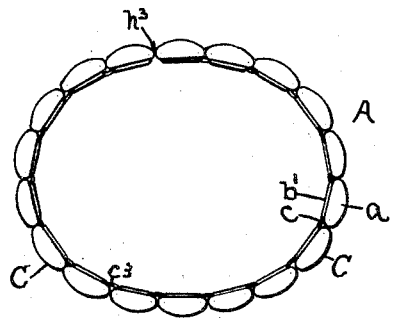
Figure 2:
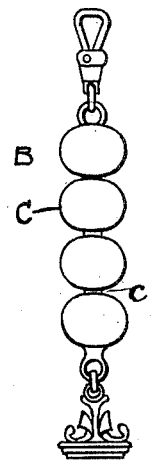
Figure 5:
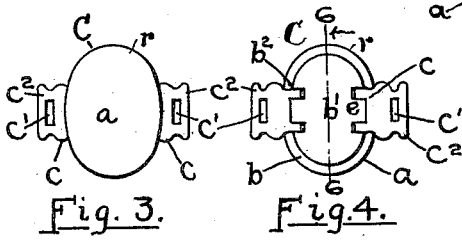
Figures 3, 4:
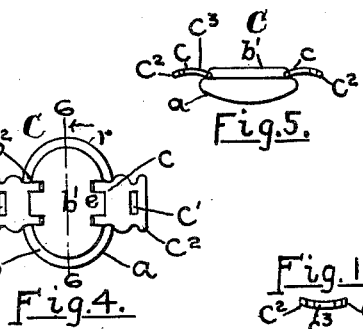
Figure 8:
Figure 10:
Figure 7:
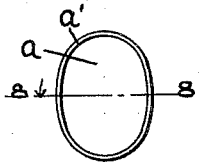
Figure 9:
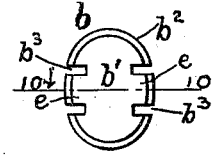
Figure 11:
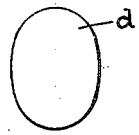
Figure 17:
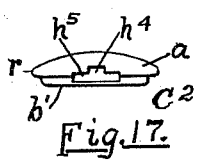
Figure 13:
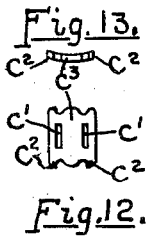
Figure 12:
Figure 6:
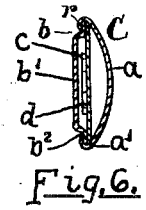
Figure 14:
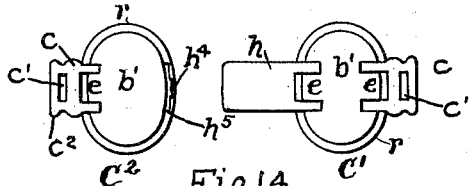
Figure 15:
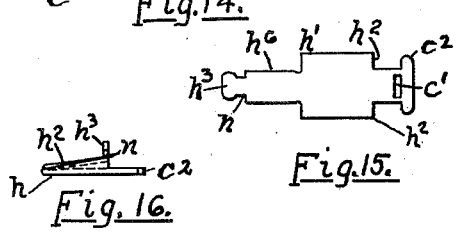
Figure 16:
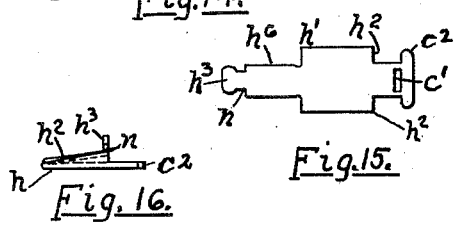

In the accompanying sheet of drawings, Figure 1 represents an edge view of a bracelet or necklace embodying my invention; Fig. 2 a front view of a fob composed of units constructed according to my improvements; Fig. 3 is a front view, in enlarged scale, of one of the units, including the connections or links; Fig. 4 is a back view of the same; Fig. 5 is an edge view; Fig. 6 is a sectional view, taken on line 6, 6 of Fig. 4; Fig. 7 is a back elevation of the unit's front cap or shoe detached; Fig. 8 is a transverse sectional view of it, taken on line 8, 8; Fig. 9 is a view of the back member of the shoe; Fig. 10 is a sectional view of it on line 10—10; Fig. 11 is a front elevation of the thin spring disk or lining member; Figs. 12 and 13 are front and edge views of one of the connecting members or links; Fig. 14 is back or reverse side elevation of the two coöperating end members of the bracelet, disconnected; Fig. 15 is a plan view of the blank from which the catch or "snap" member is formed; Fig. 16 is a side view of the latter, when bent and completed; and Fig. 17 is a side or edge view of the corresponding unit, adapted for the reception of the catch.

Again referring to the drawings, A designates a bracelet or necklace and B a fob-chain, embodying my invention. Each is provided with a series of units C, in turn consisting of a plurality of pieces, linked together by sheet-metal connections $c$. The immediately following is a description of the unit itself, or rather, each of the units comprising the major portion of the flexible article of jewelry. The unit is oval, or otherwise shaped, as desired, and hollow; its exterior consists of the struck-up front shoe member $a$ and peculiarly shaped back member $b$, the latter fitting peripherally within the rim $a^1$ of the other. The member $b$ is provided with a raised central flat portion $b^1$ and a flat peripheral flange $b^2$, the latter being slotted on opposite sides at $b^3$ to form tongues $e$ (Fig. 9), adapted to be inserted in the corresponding elongated openings of the unit-connecting links $c$.

In assembling the parts to produce a unit C, the thin, flat disk $d$ of German silver, or other suitable resilient metal is placed in the shoe $a$. Superimposed upon the disk rests the peripheral flange $b^2$ of the back member $b$; now by inturning the flange $a^1$ to form the rounded outer edge or bead $r$, all the parts are thereby secured together against separation. It may be added that the tongues $e$ intermediate of the slots $b^3$ at each side are inserted in the respective link-openings $c^1$ before the beading operation, thereby at the same time locating the lugs or trunnions $c^2$ so as to movably interlock with the adjacent edge of the raised part of the member $b$, as clearly shown. It will be seen (referring to Fig. 13) that the links $c$ are or may be made slightly convex. The chain may be built up from either or both sides of a unit, as desired. It will be seen also that the inner side or face of the units are substantially even or flush with the convex central portion $c^3$ of the link's face.

The two end units, in the case of a bracelet A, are adapted to interlock by means of a spring catch or clasp. That is to say (referring to Figs. 14 to 17), one of the units, $C^1$, is not only adapted to the link $c$, but is further arranged to receive and hold the catch member $h$ in substantially the same manner. The fellow end unit, $C^2$, is likewise arranged to hold a link $c$, and also adapted to receive the resilient tongue part of the catch $h$. This latter is formed from the sheet-metal blank $h^1$, Fig. 15. It is provided with side wings $h^2$, which are later bent upwardly (Fig. 16) to freely receive between them the rearwardly bent, resilient portion of the tongue, also shown in Fig. 16. The free or manipulatory end $h^3$ is notched at $n$ to engage the reduced part $h^4$ of the opening $h^5$ formed in the edge of unit $C^2$, Figs. 14 and 17. The side wings $h^2$, Fig. 16, serve not only to stiffen the tongue, but also prevents lateral movement of the reduced part $h^6$ when bent.

My improved units are also well adapted to be utilized in the manufacture or production of neck-chains, watch-fobs, &c., without departing from the spirit of the invention.

I claim:—

1. An improved bracelet of the articulated type, the same consisting of a plurality of hollow body units, each unit having front and back members, the outer edge of the front member rolled over that of the back member, said back member having diametrically opposed openings therethrough, links interposed between and connecting each pair of hollow units, the ends of the links being inserted in the said openings of the respective units and interlocking therewith, and means for detachably securing the ends of the bracelet together.

2. In an article of jewelry, the combination of a plurality of connected sheet metal hollow units, each unit comprising a cup-shaped front member, a recessed back member having a substantially flat peripheral flange part positioned within the said front member the periphery of the front member being rolled over said flange, oppositely disposed tongues integral with said back member, and a pair of unit-connecting links, each provided with a lateral opening near each of its ends and having said tongues of the corresponding units extending through said openings and interlocked thereunder.

3. A sheet metal unit for bracelets, said unit consisting of a front member, a recessed and flanged back member secured flatwise to said front and forming a chamber therebetween, the back member having oppositely located tongues formed therein, a resilient plate positioned in said chamber, a pair of apertured independently movable links, in coöperative engagement with the respective tongues of the said back member and with the resilient plate, and having the outer edge of the front member rolled over the corresponding edge of the back member to secure the several parts together against accidental separation.

In testimony whereof I have affixed my signature in presence of two witnesses.

FRANK P. BARNEY.

Witnesses:
   GEO. H. REMINGTON,
   CALVIN H. BROWN.

---

Copies of this patent may be obtained for five cents each, by addressing the "Commissioner of Patents, Washington, D. C."